(12) United States Patent
Oriji et al.

(10) Patent No.: US 8,308,990 B2
(45) Date of Patent: *Nov. 13, 2012

(54) CARBON NANOFIBER, PRODUCTION PROCESS AND USE

(75) Inventors: Gaku Oriji, Tokyo (JP); Eiji Kambara, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/973,644

(22) Filed: Dec. 20, 2010

(65) Prior Publication Data

US 2011/0089365 A1 Apr. 21, 2011

Related U.S. Application Data

(62) Division of application No. 12/130,603, filed on May 30, 2008, now Pat. No. 7,879,261.

(60) Provisional application No. 60/924,907, filed on Jun. 5, 2007.

(30) Foreign Application Priority Data

May 31, 2007 (JP) ................................. 2007-145225

(51) Int. Cl.
H01B 1/04 (2006.01)

(52) U.S. Cl. ..... 252/503; 252/511; 502/185; 423/447.3; 423/445 B; 367/742

(58) Field of Classification Search .................. 252/503, 252/511; 502/185; 423/447.3, 445 B; 977/742
See application file for complete search history.

(56) References Cited

U.S. PATENT DOCUMENTS

| | | | |
|---|---|---|---|
| 6,017,980 A | 1/2000 | Wang et al. | |
| 7,771,694 B2 * | 8/2010 | Kambara et al. | 423/447.1 |
| 7,846,415 B2 * | 12/2010 | Kambara et al. | 423/447.3 |
| 7,879,261 B2 * | 2/2011 | Oriji et al. | 252/503 |
| 2003/0198588 A1 | 10/2003 | Muramaki et al. | |
| 2005/0031527 A1 | 2/2005 | Ohsaki | |
| 2005/0104044 A1 | 5/2005 | Kambara et al. | |
| 2005/0260117 A1 | 11/2005 | Cossement et al. | |
| 2006/0099134 A1 | 5/2006 | Maruyama et al. | |
| 2006/0104888 A1 | 5/2006 | Higashi et al. | |
| 2006/0188717 A1 | 8/2006 | Kambara et al. | |
| 2007/0181855 A1 | 8/2007 | Nagao et al. | |
| 2007/0258881 A1 | 11/2007 | Kambara et al. | |
| 2008/0075651 A1 | 3/2008 | Higashi et al. | |
| 2009/0176100 A1 | 7/2009 | Higashi et al. | |
| 2010/0078194 A1 | 4/2010 | Bhatt et al. | |

FOREIGN PATENT DOCUMENTS

| | | |
|---|---|---|
| JP | 2003-306835 A | 10/2003 |
| JP | 2004-026626 A | 1/2004 |
| JP | 2006-502953 A | 4/2004 |
| JP | 2004-267926 A | 9/2004 |
| JP | 2004-292227 A | 10/2004 |
| JP | 2004-360099 A | 12/2004 |
| JP | 2006-015345 A | 1/2006 |
| JP | 2006-089710 A | 4/2006 |
| JP | 2007-268319 A | 10/2007 |
| WO | 2004/007820 A1 | 1/2004 |
| WO | 2004/035882 A2 | 4/2004 |
| WO | 2005/019511 A1 | 3/2005 |

OTHER PUBLICATIONS

Takehira et al., "Catalytic Growth of Carbon Fibers from Methane and Ethylene on Carbon-Supported Ni Catalysts," Applied Catalysis A, vol. 283, pp. 137-145 (2005).

* cited by examiner

*Primary Examiner* — Douglas McGinty
(74) *Attorney, Agent, or Firm* — Sughrue Mion, PLLC

(57) ABSTRACT

The invention relates to a carbon nanofiber containing at least iron (Fe) and vanadium (V), wherein the iron (Fe) is present in an amount of 6 mass % or less and the vanadium (V) is present in an amount of 3 mass % or less as a metal element other than carbon, wherein a graphite plane is inclined to the fiber axis.

10 Claims, 2 Drawing Sheets

CARBON NANOFIBER, PRODUCTION PROCESS AND USE

CROSS-REFERENCE TO RELATED APPLICATIONS

This application is a Divisional of U.S. application Ser. No. 12/130,603 filed on May 30, 2008 now U.S. Pat. No. 7,879,261, which claims the benefit of U.S. Provisional Application No. 60/924,907 filed on Jun. 5, 2007, and which claims priority from Japanese Patent Application No. 2007-145225, filed on May 31, 2007, the contents of which are incorporated herein by reference.

TECHNICAL FIELD

The present invention relates to carbon nanofiber suitable for an electrically conductive filler, and to a production method and use thereof.

BACKGROUND ART

Conventionally, it has been known that an electrically conductive resin composite material wherein electrical conductivity is imparted can be obtained by incorporating an electrically conductive filler such as carbon black, carbon fiber and metal powder to a matrix resin such as thermosetting resin and thermoplastic resin.

However, it is necessary to add considerable amount of electrically conductive filler to impart high conductivity (preferably volume resistivity of $1\times10^6$ $\Omega \cdot cm$ or less) to such kind of composite materials, which adversely affected physical properties of the matrix resin and resulted in a problem that the prepared composite material cannot exert the innate characteristics of the resin.

Therefore, a filler material has been demanded which enables to impart high conductivity even in small blending quantity.

As such an electrically conductive filler material, Japanese Laid-Open Patent Publication No. 2004-360099 discloses a fish-bone type carbonaceous microfiber body having excellent kneadability with resin and excellent electroconductivity.

The above-mentioned fish-bone type carbon fiber indicates the one having a structure in which a graphite network plane is inclined to the fiber axis. Other carbon fiber in which a graphite network plane is almost perpendicular to the fiber axis and carbon fiber which is not hollow are also known, and generally they are collectively referred to as carbon nanofiber.

On the other hand, carbon nanotubes having a structure in which a graphite network plane is approximately-parallel to the fiber axis have also been extensively studied.

As a method for producing such carbon nanotubes, a method by chemical vapor deposition (hereinafter referred to as "CVD method") is known, including a method using catalyst metal supported on a support and a method using organic metal complex and the like as a catalyst without a support wherein catalyst metal is vapor-deposited in a reaction system.

DISCLOSURE OF THE INVENTION

Problems to be Solved by the Invention

The carbon fiber disclosed by Patent Document 1 (Japanese Laid-Open Patent Publication No. 2004-360099) has a considerable amount of residues of catalyst components, which is calculated according to the Examples described in the document. In this way, when a resin composite material contains a considerable amount of impurities, it results in a problem of significant degradation of physical properties such as mechanical strength of the composite material because the impurities enhances decomposition of the resin during the molding process.

Among the above-mentioned CVD methods, in a latter method of using an organic metal complex and the like as a catalyst, the graphite layer had lots of defects and, when added as an electrically conductive filler, it sometimes failed to impart conductivity without performing high temperature treatment. Consequently, it was difficult to produce a composite material at low cost. The former method of using a catalyst support can be divided broadly into two methods: (i) a method using a substrate as a support and (ii) a method using a support in powder form. The method (i) using a substrate is widely used in the laboratory since the size of the catalyst metal can be controlled by applying various film-forming technologies. For example, Chemical Physics Letters 374 (2003) pages 22-228 discloses that a multiwall nanotube or a double-walled nanotube in a shape of a tube having a fiber diameter of about 10 to 20 nm can be obtained by using a substrate comprising a 10 nm-thick aluminum film, a 1 nm-thick iron film and a 0.2 nm-thick molybdenum film formed onto a silicon substrate. In order to use the carbon nanotubes obtained by this method for a resin composite material, the carbon nanotubes are needed to be separated from the substrate and recovered. Thus recovered carbon nanotubes substantially contain only the catalyst metal component as an impurity, but the method is not very efficient in producing carbon nanotubes and large quantity of the catalyst metal component often remains. Furthermore, to use this method industrially, it is necessary to lay out a number of substrates to gain a sufficient surface area of the substrates. Thus, the method suffers not only from low equipment efficiency but also from the disadvantage that a number of steps such as making the catalyst metal supported on the substrate, synthesizing carbon nanotubes and recovering carbon nanotubes from the substrate are required. Accordingly, the method is not economical and has not reached practical use.

On the other hand, in the method (ii) using a support in powder form, a larger specific surface area can be attained than in a method using a substrate. Therefore, the method enables not only high equipment efficiency but also the use of reaction equipment used for various chemical syntheses, which results in an advantage that the continuous reaction becomes possible as well as a production method on the premise of a batch process as in a method using a substrate. However, it is difficult to obtain highly-pure carbon fiber in this method because the catalyst support comes to be mixed in the product due to the characteristics of the synthesis method.

Accordingly, in order to reduce the amount of the impurity, methods such as (1) a method comprising heat treatment at a high temperature and (2) a method of washing and removing the impurity with acid and alkali are known. However, both of the methods comprise an involved process and therefore are not economical. Particularly, in the case of washing and removing the impurity with acid and alkali, since the catalyst support and catalyst metal in the carbon nanotubes are often coated with a carbon film, it is often difficult to remove the impurity completely without removing the carbon film by using an oxidative acid such as nitric acid or by performing partial oxidation. However, the use of such an oxidative acid may cause damage or defect not only to the support and the carbon film on the catalyst surface but also to the carbon nanotube itself, which may degrade the conductivity and the mechanical strength.

Furthermore, as a method for reducing the impurity derived from the catalyst support, it is known to use carbon such as commercially-available graphite and activated carbon as a support (for example, Japanese Laid-Open Patent Publication No. 2004-292227). However, since carbon is produced in small quantities in this method, the impurity derived from the catalyst metal increases and therefore highly-pure carbon fiber cannot be obtained.

Accordingly, a method of subjecting the carbon support to oxidation treatment in advance using hydrogen peroxide and nitric acid is disclosed in order to increase carbon fiber production (Applied Catalysis A: 283 (2005) 137). However, the method is not economical since the process also becomes complicated. Moreover, the reduction of the impurity was not necessarily enough.

Published Japanese Translation of PCT Publication No. 2006-502953 (WO2004/035882) discloses that the carbon nanofiber having carbon content of 95 mass % or more by using specific carbon black having total amount of oxygen of 10 mass % or more. However, as the present inventors indicate in the Comparative Example described hereinafter, the resin composite material does not exhibit sufficient conductivity when the filler prepared using such a specific carbon support was added thereto.

In order to enhance the carbon fiber production, elements such as iron, nickel and cobalt are generally used as a catalyst. In addition, a method of adding other fiber metal as a promoter has also been widely developed (for example, Japanese Laid-Open Patent Publication No. 2004-26626).

However, the generation efficiency of the carbon fiber and the characteristics of the filler greatly vary depending on the combination of a catalyst, a promoter and a catalyst support; hydrocarbon used as a carbon source; and reaction conditions, and there has not been sufficient disclosure with respect to each combination.

That is, inexpensive carbon fiber filler has not been developed so far, which does not substantially contain metal elements as an impurity (i.e. metal elements other than Fe and V) and enables the resin composite material to exhibit conductivity when added thereto in a small amount.

Consequently, an objective of the present invention is to provide inexpensive carbon fiber filler material, which does not substantially contain metal elements as an impurity (i.e. metal elements other than Fe and V) and enables the resin composite material to exhibit conductivity when added thereto in a small amount.

Means to Solve the Problem

As a result of intensive studies, the present inventors have found a carbon nanofiber as a high-performance conductive filler and a production method thereof, and accomplished the present invention based on the finding.

The present invention relates to the following carbon nanofiber, a production method and use thereof.
1. Carbon nanofiber containing iron (Fe) of 6 mass % or less and vanadium (V) of 3 mass % or less as a metal element other than carbon, which does not substantially contain metal elements other than Fe and V.
2. A method for producing carbon nanofiber characterized in contacting a catalyst in which Fe and V are supported on a carbon support and a carbon-containing compound at a temperature of 400 to 1100° C.
3. The method for producing carbon nanofiber as described in 2 above, wherein the specific surface area of the carbon support is 30 to 500 m$^2$/g.
4. The method for producing carbon nanofiber as described in 2 above, wherein the carbon support is carbon black having specific surface area of 500 m$^2$/g or more subjected to heat treatment at 2000 to 3000° C.
5. The method for producing carbon nanofiber as described in 2 above, wherein the catalyst having an iron concentration of 5 to 30 mass % is used when the iron concentration in the catalyst is calculated by the following formula:

{(iron mass)/(iron mass+support mass)}×100(mass %)         [Equation 1]

6. The method for producing carbon nanofiber as described in 2 above, using a catalyst wherein a vanadium concentration in the catalyst is 20 to 100 mol % based on the number of moles of the iron.
7. The method for producing carbon nanofiber as described in 2 above, wherein the carbon-containing compound is at least one member selected from CO, $CO_2$, aliphatic hydrocarbon and aromatic hydrocarbon.
8. The method for producing carbon nanofiber as described in 2 above, wherein the carbon-containing compound is ethylene.
9. The method for producing carbon nanofiber as described in 2 above, wherein a carrier gas is used in addition to the carbon-containing compound.
10. The method for producing carbon nanofiber as described in 9 above, wherein the carrier gas is a gas containing hydrogen.
11. Carbon nanofiber obtained by a method described in any one of 2 to 10 above.
12. A composite material of carbon nanofiber and resin, wherein the carbon nanofiber described in 1 or 11 above is blended into resin.
13. A container for electric or electronic devices using the composite material of carbon nanofiber and resin described in 12 above.
14. An electroconductive slide member using the composite material of carbon nanofiber and resin described in 12 above.
15. An electroconductive and thermally-conductive member using the composite material of carbon nanofiber and resin described in 12 above.

Effect of the Invention

According to the present invention, carbon nanofiber suitable for use in a filler for conductive resin can be obtained. Since the carbon nanofiber in the preferred embodiment of the present invention can impart high conductivity to a resin in a smaller additive amount than in conventional cases, it enables to obtain conductive resin composite material containing a small amount of metal element impurity at low cost.

BEST MODE FOR CARRYING OUT THE INVENTION

The carbon nanofiber in the preferred embodiment of the present invention has a structure in which a graphite plane is inclined to the fiber axis. The angle θ made by the fiber axis and the graphite plane is measured from the transmission electron microscope (TEM) image (see FIG. 1). The angle θ is not particularly limited but preferably 15 to 90°, more preferably 30 to 70°.

Thus, due to the inclination of the graphite plane to the fiber axis, the carbon nanofiber has a number of active sites on the surface compared to tubular fiber wherein the angle θ is approximately 0 and therefore enhances the interaction with the resin when used as a filler in the resin. Accordingly, improvement in dispersion and adhesiveness can be expected: i.e. dispersion of the filler may be improved and the interface strength with resin may be enhanced. As a result, the filler can expect sufficient functional improvement even in a small additive amount when made into a composite material and therefore is economical.

The center of the fiber may be hollow. Or the fiber filaments may be connected to each other in spots in the center or may be totally-connected without a hollow portion in the center.

The above-mentioned carbon nanofiber is characterized in that it does not substantially contain metal elements as impurities (i.e. metal elements other than Fe and V) except iron of 6 mass % or less, preferably 3 mass % or less, more preferably 1 mass % and vanadium of 3 mass % or less, preferably 2 mass % or less, more preferably 1 mass % or less as metal elements. Here, the metal elements indicate all the elements except for H, N, O, S, F, Cl, Br, I, He, Ne, Ar, Kr, Xe, Rn and carbon in the periodic table.

In the preferred embodiment of the present invention, a catalyst in powder form is used in which Fe and V as a metal catalyst are supported on a carbon support in a specific powder form as described hereinafter. The carbon fiber produced thereof may contain the carbon support besides the metal elements of iron and vanadium.

When carbon nanofiber is added as a filler to a resin, it may be exposed to a high temperature at the time of kneading with resin, molding and curing depending on the kind of the resin and the molding method. In such a case, the deterioration of the resin and defects in curing may be caused due to the remaining metal impurity. Also, there are concerns about degradation of the mechanical strength and characteristics with time due to the remaining metal impurity or efflux of the metal impurity as ion impurity during the use of the product after molding. Therefore, it is desirable to reduce the amount of the impurity in the carbon nanofiber as much as possible.

Meanwhile, the carbon support has little effect compared to the other metal elements because it remains only in a small amount and has similar characteristics with those of the produced carbon fiber in many cases.

The method for analyzing the metal elements is not particularly limited but ICP-AES (inductively-coupled plasma atomic emission spectrometry) analysis is preferably used. The pretreatment method of the samples is not particularly limited, and preferably, the carbon nanofiber decomposed by sulfuric acid and nitric acid is dissolved by adding phosphoric acid. Here, "not substantially containing the other metal elements" usually means that the content of the metal elements is less than 100 ppm.

[Synthesis Method of Carbon Nanofiber]
Catalyst:

It is preferable to use iron as a catalyst, vanadium as a promoter and carbon as a support.

The method for making iron and vanadium supported on the carbon support is not particularly limited. For example, an oxide and a salt of metal can be supported on a support by impregnating a support with a nonaqueous solution (such as a methanol solution) or an aqueous solution in which iron salt and vanadium salt are dissolved and dispersing and mixing the support sufficiently, followed by drying. Alternatively, iron and vanadium may be dissolved in a separate solution to impregnate a support with each solution so as to make an oxide and a salt of metal supported thereon. Iron and vanadium from a solution containing iron and vanadium may be precipitated onto a support.

An iron material used here is not particularly limited. However, in view of ease of preparation of a metal-salt solution used in the above-described method, inorganic acid salt such as iron nitrate, iron acetate, iron sulfate and alum; complex salt such as acetylacetonato complex; a halide such as iron chloride, iron bromide and iron fluoride; and organic acid salt such as iron oxalate and iron stearate can be suitably used.

A vanadium material used here is not particularly limited. However, in view of ease of preparation and the cost of a metal-salt solution used in the above-described method, oxide salt such as vanadate and vanadyl salt; chloride salt such as vanadium chloride; oxide such as vanadium oxide; and complex salt such as acetylacetonate analogous complex can be suitably used.

A suitable example of a carbon support preferably has a specific surface area of 30 to 500 $m^2/g$, more preferably 60 to 500 $m^2/g$, most preferably 100 to 300 $m^2/g$. Use of a carbon support having a large specific surface area is preferable since a larger amount of iron can be minutely supported thereon, which enables to increase the yield. However, when the specific surface area of the carbon support is too large, it may tend to lower the electroconductivity of a resin composite material produced thereof.

Still another example of the carbon support preferably has a graphitic surface. A carbon support having a graphitic surface with few surface functional groups is preferable than that having high oxygen content and surface functional groups.

As a more specific example, a carbonaceous material such as carbon black having high-specific surface area, a carbonaceous material subjected to heat treatment at 2000 to 3000° C. under an inert gas atmosphere, and swarf of a graphite electrode are preferable. Most preferable is the carbon black having specific area of 500 $m^2/g$ or more subjected to heat treatment at 2000 to 3000° C. Here, carbon black collectively means carbon powder in fine particles and aggregates thereof including the one obtained by a thermal decomposition method such as the acetylene method and the thermal method; the one obtained by an incomplete combustion method represented by furnace black; and ketjen black.

Conventionally, a support generally regarded as highly active has been mainly used, e.g. a highly-active support having an extremely high specific surface area such as activated carbon and the one further subjected to surface modification. The present invention enables to use a carbon support having a low surface activity and a medium-level specific surface area or a support having a graphitic surface comprising few or no surface functional group. Generally, the level of carbon fiber production is not so high when such a low-active support is used. However, the present invention has succeeded in increasing the catalyst activity by selecting specific catalyst metal components of Fe and V for such a low-active support.

In cases of a conventional use of a highly-active carbon support, it tends to cause deposition of impurities such as carbon particles onto the produced carbon nanofiber or deposition of amorphous carbon on the fiber surface or between the fiber, which may be because the decomposition of hydrocarbon or production of the intermediate is promoted on the surface of the carbon. Therefore, it was often necessary to increase the additive amount of the filler to attain desired characteristics, which may be due to the low dispersibility when used as a resin filler or due to inferior property of the fiber itself.

In preferred embodiments of the present invention, by using a support having less activity, it is possible to prevent the functional decline of the carbon nanofiber or the material containing the carbon nanofiber due to the above-mentioned by-product carbon.

When a method for preparing a catalyst of the present invention is used, it is often the case that the catalyst metal exists as a precursor thereof such as a metal salt, complex or oxide before the initiation of the reaction. Therefore, generally, the catalyst precursor is first reduced to catalyst metal by performing reduction treatment or the like before the initiation of the reaction with hydrocarbon. However, with respect to the carbon support having an active carbon surface used in the conventional art, the catalyst precursor may be reduced in some cases due to the reduction action of the carbon itself without intentionally performing a reduction treatment. Accordingly, it enables to produce carbon fiber using fine metal catalyst particles by combining appropriate carbon source and reaction conditions.

Meanwhile, the particle size of the catalyst metal may greatly influence the production mechanism of the carbon fiber produced thereof. The use of fine catalyst metal particles tends to result in production of tubular carbon nanotubes, in which the above-mentioned θ is approximately a zero-degree angle, while the use of larger catalyst metal particles is likely to produce the carbon fiber in which a graphite plane is inclined or perpendicular to the fiber axis. Furthermore, the catalyst metal particles may be reduced at a temperature region lower than the reaction temperature depending on the combination of the carbon source and reaction conditions, and in such a case, the highly-active catalyst metal particles grow too much through aggregation with each other and fail to function as a catalyst for producing carbon nanofiber, which tends to hardly produce a carbon component or to produce only carbon other than fiber such as amorphous carbon.

Thus, since carbon fiber is produced from fine particles of the catalyst metal when the above-mentioned carbon support having an active carbon surface is used, it often results in the production of tubular-type fiber. The carbon nanofiber as one preferred embodiment of the present invention in which a graphite plane is inclined to the fiber axis has strong interaction with resin when used as a filler material compared to the tubular-type carbon fiber, and therefore enables to enhance the physical properties of the resin.

As described above, the particle size of the catalyst metal can be appropriately adjusted in the present invention by adding vanadium and selecting an appropriate carbon support, and as a result, it is presumed that the fiber in which a graphite plane is inclined to the fiber axis is readily produced.

In the present invention, the iron concentration in the catalyst to produce carbon nanofiber is 5 mass % or more, preferably 5 to 30 mass %, particularly preferably 5 to 20 mass % when obtained from the formula:

$$\{(\text{iron mass})/(\text{iron mass}+\text{support mass})\} \times 100 (\text{mass \%}) \qquad [\text{Equation 1}]$$

When the iron concentration is less than 5 mass %, it tends to result in an extremely low yield. On the other hand, the yield does not increase indefinitely but have a limit even if the iron concentration is arranged too high. Therefore, an excessively high iron concentration is likely to increase the impurity concentration in the product.

Preferred additive amount of vanadium is 20 to 100 mol %, more preferably 20 to 80 mol %, most preferably 40 to 80 mol % to the amount of iron. If the additive amount of vanadium is less than 20 mol %, it is likely to lower the conductivity when added to the resin. If the additive amount exceeds 100 mol %, it tends to decrease the production of carbon nanofiber.

[Carbon-Containing Compound]

In the present invention, a carbon-containing compound is not particularly limited. As a carbon-containing compound, $CCl_4$, $CHCl_3$, $CH_2Cl_2$, $CH_3Cl$, $CO$, $CO_2$, $CS_2$ and other organic compounds can be used generally. Particularly useful compounds include $CO$, $CO_2$, aliphatic hydrocarbon and aromatic hydrocarbon. Besides, a carbon compound comprising elements such as nitrogen, phosphorous, oxygen, sulfur, fluorine, chlorine, bromine and iodine can also be used.

Preferred examples of the carbon compound include inorganic gas such as $CO$ and $CO_2$; alkane such as methane, ethane, propane, butane, pentane, hexane, heptane, octane; alkene such as ethylene, propylene and butadiene; alkine such as acetylene; monocyclic aromatic hydrocarbon such as benzene, toluene, xylene and styrene; polycyclic compounds having a condensed ring such as indene, naphthalene, anthracene and phenanthrene; cycloparaffin such as cyclopropane, cyclopentane and cyclohexane; cycloolefine such as cyclopentene, cyclohexene, cyclopentadiene and dicyclopentadiene; and alicyclic hydrocarbon compounds having a condensed ring such as steroid. Furthermore, derivatives containing oxygen, nitrogen, sulfur, phosphorous, halogen and the like in addition to the above hydrocarbons can be used, i.e. an oxygen-containing compound such as methanol, ethanol, propanol and butanol; a sulfur-containing aliphatic compound such as methylthiol, methylethylsulfide and dimethylthioketone; a sulfur-containing aromatic compound such as phenylthiol and diphenylsulfide; a sulfur- or nitrogen-containing heterocyclic compound such as pyridine, quinoline, benzothiophene and thiophene; and halogenated hydrocarbon such as chloroform, carbon tetrachloride, chloroethane and trichloroethylene. Also, natural gas, gasoline, heating oil, heavy oil, creosote oil, kerosene, turpentine oil, camphor oil, pine oil, gear oil and cylinder oil can be used, though they are not a single substance. A mixture thereof can also be used.

More preferable carbon compound include CO, methane, ethane, propane, butane, ethylene, propylene, butadiene, acetylene, benzene, toluene, xylene and mixture thereof.

[Carrier Gas]

In the production of the carbon nanofiber of the present invention, it is recommended to use carrier gas in addition to the above-mentioned carbon compounds. As the carrier gas, hydrogen, nitrogen, carbon dioxide, helium, argon, krypton or mixed gas thereof can be used. However, a gas comprising an oxygen molecule (i.e. oxygen in molecular state: $O_2$) such as air is not suitable. The precursor compound of the catalyst used in the present invention may sometimes be in an oxidized state, and in such a case, it is preferable to use a hydrogen-containing gas as a carrier gas. Accordingly, the carrier gas is the gas preferably containing hydrogen of 1 vol % or more, more preferably 30 vol % or more, most preferably 85 vol % or more, for example, 100 vol % hydrogen or a gas obtained by diluting hydrogen with nitrogen.

In the present invention, it is desirable to perform reduction treatment before the carbon-containing gas is provided. The reduction treatment can be carried out by retaining the catalyst precursor in a reducing gas such as hydrogen.

Though the temperature and time for performing such reduction treatment cannot be uniformly defined depending on the kind of the support to be used, contact efficiency with the reducing gas and the kind of the reducing gas, the reduction temperature is preferably 300 to 1000° C., time for reduction is preferably from ten minutes to five hours, and a longer time for reduction is desirable in the case of reduction at a low temperature. More preferably, reduction temperature is 500 to 700° C. and time for reduction is 10 to 60 minutes.

In the reduction treatment, both of excessive reduction and insufficient reduction may result in failure to keep the catalyst metal particles in an appropriate size. The preferable size of the catalyst metal particles can be determined by the measurement of the transmission electron microscope (TEM)

image (see FIG. 2). Generally, the size is preferably about 5 to 100 nm, more preferably about 5 to 50 nm, most preferably 10 to 40 nm.

[Concentration of Carbon-Containing Gas]

With respect to the above-mentioned carbon-containing compound in liquid or solid state at room temperature, it is preferable to introduce the compound after being evaporated by heating. The supply of the carbon-containing gas varies depending on the catalyst to be used, carbon source and reaction conditions, and therefore cannot be uniformly determined. However, the preferred range is generally 10 to 90 vol %, more preferably 30 to 70 vol % when obtained from the following equation:

$$\{(\text{flow rate of carbon-containing gas})/(\text{flow rate of the carrier gas}+\text{flow rate of carbon-containing gas})\} \times 100 \quad \text{[Equation 2]}$$

Particularly, when the carbon-containing gas is ethylene, the range of 30 to 90 vol % is most preferable.

In the present invention, the temperature at which a catalyst is contacted with a carbon-containing compound to produce carbon nanofiber varies depending on the carbon source to be used and the like, but generally 400 to 1100° C., preferably 500 to 800° C. When the ethylene is used as a material, the temperature is 400 to 800° C., preferably 500 to 640° C., most preferably 520 to 600° C. When the temperature is too low or too high, it may extremely decrease the fiber production. Also, at a high temperature such that a substance other than carbon nanofiber is produced, nonconductive substances are likely to attach onto the surface of the carbon fiber, which is not suited to applications of carbon nanofiber for the use in resin.

One characteristic of the carbon nanofiber in the preferred embodiment of the present invention (may be simply referred to as "carbon fiber" hereinafter) is that it shows sufficient electroconductivity when used as a filler without a step of graphitization at a high temperature. Naturally, it is also possible to further improve the electroconductivity by performing graphitization treatment at a high temperature.

A compounded resin can be prepared by blending the carbon fiber in a preferred embodiment of the present invention into resin and kneading them. The additive amount of the carbon fiber used in a compounded resin is preferably 1 to 30 mass %. If the additive amount is less than 1 mass %, it is difficult to make sufficient electrically conductive paths and thermally-conductive path in the compounded resin. On the other hand, if carbon fiber is added in a high concentration exceeding 30 mass %, it is likely to cause the property loss of the resin.

The resin to be used for the resin composite material in the preferred embodiment of the present invention is not particularly limited, but thermosetting resin, photocuring resin or thermoplastic resin is preferable.

As thermosetting resin, for example, polyamide, polyether, polyimide, polysulphone, epoxy resin, unsaturated polyester resin, phenol resin and the like can be used. As thermoplastic resin, nylon resin, polyethylene resin, polyamide resin and polyester resin, polycarbonate resin, polyarylate resin and the like can be used.

The resin composite material in which carbon fiber is blended in the preferred embodiment of the present invention can be suitably employed as a molding material for producing articles which require impact resistance and conductivity or antistatic property; e.g., OA apparatuses, electronic apparatuses, conductive packaging parts, conductive sliding members, conductive thermal-conducting members, antistatic packaging parts, and automobile parts to be coated with static coating. These articles may be produced through any conventionally known molding method of conductive resin compositions. Examples of the molding methods include injection molding, blow molding, extrusion, sheet molding, heat molding, rotational molding, lamination molding and transfer molding.

Also, the carbon fiber according to the present invention is applicable to an additive for a battery and an electrode material for capacitors and to a support for various catalysts.

EXAMPLES

Hereinafter, the present invention is described in further detail in reference to examples and comparative examples, but should not be construed as being limited thereto.

[Reagent]

The reagents used in the following examples are as follows: iron nitrate nonahydrate (special grade chemicals manufactured by Wako Pure Chemical Industries, Ltd.), ammonium metavanadate (special grade chemicals manufactured by Kanto Chemical Co., Inc.), ammonium tungstate para pentahydrate (manufactured by Wako Pure Chemical Industries, Ltd.), chromium nitrate nonahydrate (manufactured by Wako Pure Chemical Industries, Ltd.), ammonium molybdate (manufactured by Wako Pure Chemical Industries, Ltd.), carbon black Show Black MAF (manufactured by Cabot Corporation), Carbon Black BP-2000 (manufactured by Cabot Corporation), Carbon Black #3050 (manufactured by Mitsubishi Chemical Corporation), Ketjen Black EC-300J (manufactured by Ketjen Black International Company Ltd.), UF-G5 (manufactured by Show Denko K.K.), VGCF (registered trademark; manufactured by Showa Denko K.K.), activated carbon Darco G60 (reagent manufactured by Wako Pure Chemical Industries, Ltd.), Denka Black (manufactured by Denki Kagaku Kogyo K.K.) and methanol (special grade chemicals manufactured by Wako Pure Chemical Industries, Ltd.)

[Heat Treatment of the Catalyst Support]

A predetermined amount of the carbonaceous material was charged in a graphite crucible and subjected to heat treatment at 2800° C. in an argon gas for 30 minutes. The obtained sample was crushed and used for preparing a catalyst.

[Preparation of a Catalyst]

A predetermined amount of iron nitrate nonahydrate was dissolved into methanol and a predetermined amount of ammonium metavanadate was dissolved thereto. The resultant was delivered by drops onto a support and kneaded to obtain paste. The paste was dried under reduced pressure at 100° C. for four hours and crushed to thereby obtain a catalyst.

Here, the predetermined amount (additive amount) of iron nitrate was determined so as to satisfy the following equation:

$$\{(\text{iron mass})/(\text{iron mass}+\text{support mass})\} \times 100 = \text{iron mass \%} \quad \text{[Equation 3]}$$

With respect to the predetermined amount (additive amount) of ammonium metavanadate, the requirement is calculated from the above-mentioned iron mass and number of moles.

[Synthesis of Carbon Nanofiber]

Ten quartz boats (2 centimeters wide) bearing a catalyst were allocated in a horizontal reacting furnace of about 40 cm provided in the center of a quartz tube having an inner diameter of 3.2 cm (1 m in length) and nitrogen was passed through at 500 ml/minute. The quartz tube was placed in an electric furnace and heated for one hour so that the center temperature reached a predetermined temperature, followed by being kept at a predetermined temperature for 30 minutes. Next, the gas was switched to hydrogen with 500 ml/minute and the furnace was kept for another 30 minutes. Subsequently, the gas was switched to ethylene with 250 ml/minutes and hydrogen with 250 ml/minute (in the case where ethylene concentration is 50 vol %) and the furnace was kept for a predetermined time, and then the gas was switched to hydrogen with 500 ml/minute and the furnace was cooled to room temperature.

[Production of a Thermosetting Resin Composite Material]

2 g of carbon fiber and Ripoxy resin B-806 manufactured by Showa Highpolymer Co., Ltd. in total of 50 g and 2.5 g of benzoyl peroxide (mixture containing 35 mass % thereof) manufactured by Sigma Aldrich Japan were weighed on the defoaming mixer "Awatori Rentaro" (trade name) manufactured by THINKY Corporation and mixed at agitating mode (2000 rpm) for three minutes and at defoaming mode (2200 rpm) for three minutes. The obtained mixture was placed in a stainless form (100 millimeters square and 2 millimeters thick) and cured in an oven at 150° C. for three hours to thereby obtain a thermosetting resin composite material containing carbon nanofiber on the plate.

[Measurement of the Surface Resistance]

The surface resistivity was measured using LORESTA-GP (low resistivity meter) and HIRESTA-UP (high resistivity meter) manufactured by Mitsubishi Chemical Corporation.

Example 1

Using a catalyst wherein 20 mass % of iron and 80 mol % of vanadium based on iron were supported on a support obtained by heat treating Ketjen Black EC-300J at 2800° C., ethylene used as a material was reacted with the catalyst at 540° C. for one hour. Carbon nanofiber of 20 to 50 nm in diameter having a herringbone structure was confirmed by observing the obtained product under transmission electron microscope (TEM) (see FIG. 1 and FIG. 2). As a result of analysis by ICP-AES, 0.7 mass % or Fe and 0.3 mass % of V were detected and the metal elements other than Fe and V were less than 100 ppm.

Using the obtained carbon fiber and thermosetting resin (Ripoxy resin B-806 manufactured by Showa Highpolymer Co., Ltd.), a resin composite material containing 4 mass % of carbon nanofiber was produced. The property (surface resistance) of the obtained resin composite material was $3 \times 10^5$ $\Omega/g$ (see Table 1). The resin composite material exhibited conductivity by addition of carbon nanofiber in an amount of as small as 4 mass %.

TABLE 1

|  |  | Example 1 |
|---|---|---|
| Carbon Fiber | Fe mass % | 0.7 |
|  | V mass % | 0.3 |
| Surface resistance of the composite material $\Omega/\square$ |  | 3E+05 |

Comparative Examples 1 to 3

Comparative Examples were carried out in the same way as Example 1 except that molybdenum (ammonium modybdate), chromium (chromium nitrate), tungsten (ammonium tungstate) were used instead of vanadium. The results are shown in Table 2.

TABLE 2

|  | Comparative Example 1 | Comparative Example 2 | Comparative Example 3 |
|---|---|---|---|
| Promoter | Mo | Cr | W |
| Carbon fiber Fe mass % | 5.6 | 5.2 | 4.8 |
| Surface resistance of the composite material $\Omega/\square$ | 9E+09 | 2E+10 | 3E+10 |

As seen from Table 2, the products of Ketjen black EC-300J subjected to graphitization treatment at 2800° C. on which Fe—Mo, Fe—Cr or Fe—W was supported failed to exhibit electric conductivity as shown in Example 1.

Examples 2 to 7 and Comparative Examples 4 to 5

Carbon nanofiber was synthesized in the same way as in Example 1 except that the carbon support as in Table 3 was used (Example 2: Carbon black Show Black MAF, manufactured by Cabot Corporation), Example 3: Denka Black, manufactured by Denki Kagaku Kogyo K.K., Example 4: Carbon Black BP-2000, manufactured by Cabot Corporation, Example 5: product of Ketjen Black (manufactured by Ketjen Black International Company Ltd.) subjected to heat treatment at 2800° C., Example 6: UF-G5, manufactured by Show Denko K.K., high-grade artificial graphite fine particles subjected to heat treatment at 3000° C., Example 7: VGCF (registered trademark) manufactured by Showa Denko K.K., graphitized product by heat treatment at 2800° C., Comparative Example 4: Ketjen Black EC-300J, manufactured by Ketjen Black International Company Ltd., and Comparative Example 5: activated carbon Darco G60, manufactured by Wako Pure Chemical Industries, Ltd.) Thermosetting resin composite materials were prepared by using the carbon nanofiber and their property (surface resistance) was evaluated. The results are shown in Table 3.

A highly-pure resin composite material exhibiting high electric conductivity was obtained by using a support having a specific surface area (13 to 190 m²/g) and a support subjected to heat treatment at 2800° C. (Examples 4 to 7). On the other hand, the electric conductivity was lowered when the specific surface area of the support was too large (Comparative Examples 4 to 5).

The specific surface area shown in the tables is the value measured by means of BET-method specific surface analyzer NOVA 1200, manufactured by Yuasa Ionics Inc. after vacuum deaeration at 300° C. for 20 minutes.

Comparative Example 6

In the same way as in Example 1 of Published Japanese Translation of POT Publication No. 2006-502953 (Patent Document 3), the comparative example was carried out by preparing a catalyst in which Fe and Ni are supported on a support made from Carbon Black #3050 manufactured by Mitsubishi Chemical Corporation. The result in Table 3 showed that the obtained composite material had lower electric conductivity.

TABLE 3

|  |  | Examples | | | | | | Comparative Examples | | |
|---|---|---|---|---|---|---|---|---|---|---|
|  |  | 2 | 3 | 4 | 5 | 6 | 7 | 4 | 5 | 6 |
| Catalyst support | Name | MAF | Denka Black | BP-2000 | EC300J | UF-G5 | VGCF* | EC300J | G-60 | 3050 |
|  | Heat treatment | No | No | 2800° C. | 2800° C. | 3000° C. | 2800° C. | No | No | No |
|  | Specific surface area | 50 | 70 | 190 | 130 | 40 | 13 | 800 | 600 | 48 |
| Carbon Fiber | Fe mass % | 2.5 | 4.5 | 0.8 | 0.8 | 3.3 | 5.0 | 0.9 | 7.1 | 1.3 |
|  | V mass % | 1.1 | 2.1 | 0.4 | 0.4 | 1.5 | 2.3 | 0.4 | 3.3 | — |
|  | Surface resistance of the composite material Ω/□ | 4E+03 | 2E+06 | 3E+05 | 3E+05 | 8E+03 | 5E+06 | 9E+10 | 4E+10 | 9E+10 |

*Registered trademark of Showa Denko K. K.

Examples 8 to 10 and Comparative Examples 7 to 8

Carbon nanofiber was synthesized in the same way as in Example 2 using a catalyst wherein Fe and V are supported on a support made of carbon black Show Black MAF (manufactured by Cabot Corporation) except that the reaction temperature was set to 440 to 690° C. Thermosetting resin composite materials were prepared by using the carbon nanofiber and their property (surface resistance) was evaluated. The results are shown in Table 4.

TABLE 4

|  | Example 8 | Example 2 | Example 9 | Example 10 | Comparative Example 7 | Comparative Example 8 |
|---|---|---|---|---|---|---|
| Reaction temperature ° C. | 490 | 540 | 590 | 640 | 440 | 690 |
| Carbon fiber Fe mass % | 5.6 | 2.5 | 3.3 | 3.8 | Fiber was not obtained | 3.2 |
| V mass % | 2.5 | 1.1 | 1.5 | 1.8 |  | 1.5 |
| Surface resistance of the composite material Ω/□ | 3E+04 | 4E+03 | 3E+03 | 6E+04 |  | 2E+09 |

In the reaction using ethylene as carbon source, little or no carbon nanofiber was produced at a reaction temperature of 440° C. Also, the higher the reaction temperature, the lower the electric conductivity of the composite material obtained thereof (at 690° C. in Comparative Example 8).

Examples 11 to 13 and Comparative Examples 9 to 10

Carbon nanofiber was synthesized in the same way as in Example 2 except that the ethylene concentration was changed to 10 to 98 vol %. Thermosetting resin composite materials were prepared by using the carbon nanofiber and their property (surface resistance) was evaluated. The results are shown in Table 5.

TABLE 5

|  | Example 11 | Example 2 | Example 12 | Example 13 | Comparative Example 9 | Comparative Example 10 |
|---|---|---|---|---|---|---|
| Ethylene concentration % | 30 | 50 | 70 | 90 | 10 | 98 |
| Carbon Fiber Fe mass % | 2.7 | 2.5 | 3.1 | 3.6 | 5.0 | 5.0 |
| V mass % | 1.2 | 1.1 | 1.4 | 2.6 | 2.3 | 2.3 |
| Surface resistance of the composite material Ω/□ | 7E+03 | 4E+03 | 4E+03 | 2E+05 | 7E+09 | 5E+10 |

In cases when the ethylene concentration was 30 to 90 vol %, the obtained thermosetting resin composition material showed electric conductivity as high as $7 \times 10^3$ to $2 \times 10^5 \Omega/\square$. However, when the concentration was 10 vol % or 98 vol %, which was out of the above-mentioned range, the electric conductivity was lowered (Comparative Examples 9 to 10).

Examples 14 to 17 and Comparative Example 11

Carbon nanofiber was synthesized in the same way as in Example 2 except that a catalyst was used in which the amount of supported Fe was adjusted to 1 to 40 mass %.

Thermosetting resin composite materials were prepared by using the carbon nanofiber and their property (surface resistance) was evaluated. The results are shown in Table 6.

TABLE 6

|  | Example 14 | Example 15 | Example 2 | Example 16 | Example 17 | Comparative Example 11 |
|---|---|---|---|---|---|---|
| Amount of supported Fe wt % | 5 | 10 | 20 | 30 | 40 | 1 |
| Carbon fiber Fe mass % | 0.6 | 1.0 | 2.5 | 3.0 | 5.0 | 0.5 |
| Carbon fiber V mass % | 0.3 | 0.5 | 1.1 | 1.4 | 2.3 | 0.2 |
| Surface resistance of the composite material Ω/□ | 8E+05 | 3E+04 | 4E+03 | 3E+05 | 5E+06 | 5E+09 |

In cases when the catalyst on which Fe was supported in an amount of 5 to 40 mass % was used, the obtained thermosetting resin composition material showed electric conductivity as high as $4 \times 10^3$ to $8 \times 10^5 \Omega/\square$. However, when the amount of supported Fe was 1 vol %, the electric conductivity was lowered (Comparative Example 11; $5 \times 10^9 \Omega/\square$).

Examples 18 to 21 and Comparative Examples 12 to 13

Carbon nanofiber was synthesized in the same way as in Example 15 except that a catalyst was used in which the additive amount of vanadium was adjusted to 10 to 150 mol % based on iron. Thermosetting resin composite materials were prepared by using the carbon nanofiber and their property (surface resistance) was evaluated. The results are shown in Table 7.

TABLE 7

|  | Example 18 | Example 19 | Example 20 | Example 21 | Comparative Example 12 | Comparative Example 13 |
|---|---|---|---|---|---|---|
| Additive amount of V (to iron) mol % | 20 | 60 | 90 | 100 | 10 | 150 |
| Carbon fiber Fe mass % | 1.2 | 1.1 | 1.8 | 2.3 | 5.0 | 6.3 |
| Carbon fiber V mass % | 0.2 | 0.6 | 1.5 | 2.1 | 0.5 | 8.6 |
| Surface resistance of the composite material Ω/□ | 1E+05 | 3E+03 | 5E+03 | 1E+04 | 3E+10 | 8E+10 |

In cases when the catalyst having vanadium in an additive amount of 20 to 100 mol % based on iron was used, the obtained thermosetting resin composition material showed electric conductivity as high as $3 \times 10^3$ to $10^5 \Omega/\square$. However, when the additive amount of vanadium was 10 mol % (Comparative Example 12) or 150 mol % (Comparative Example 13), which was out of the above-mentioned range, the composite material showed low electric conductivity.

Figure 1:
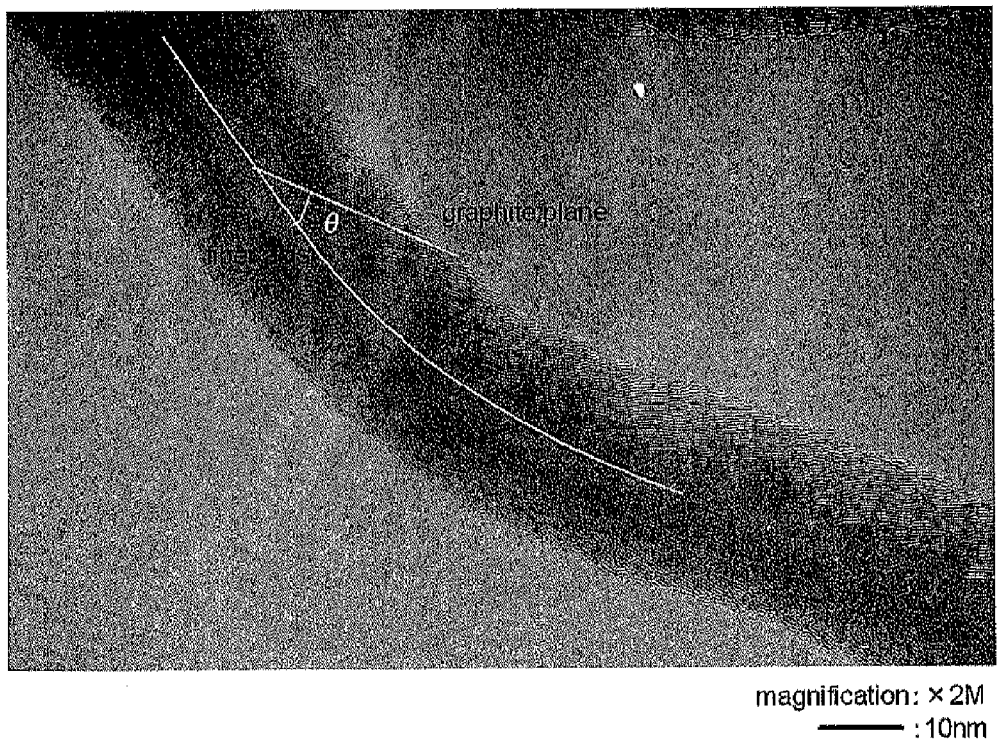
FIG. 1 is a photograph of the product obtained in Example 1 observed under transmission electron microscope (TEM).
Figure 2:
FIG. 2 is a photograph of the catalyst part in the product obtained in Example 1 observed under transmission electron microscope (TEM).

The invention claimed is:

1. Carbon nanofiber containing at least iron (Fe) and vanadium (V), wherein the iron (Fe) is present in an amount of 6 mass % or less and the vanadium (V) is present in an amount of 3 mass % or less as a metal element other than carbon, wherein the carbon nanofiber has a fiber axis and a graphite plane, and the graphite plane is inclined to the fiber axis.

2. The carbon nanofiber as claimed in claim 1, wherein the angle of the graphite plane is 15° to 90° to the fiber axis.

3. A composite material of carbon nanofiber and resin, wherein the carbon nanofiber claimed in claim 1 is blended into resin.

4. A container for electric or electronic devices using the composite material of carbon nanofiber and resin claimed in claim 3.

5. An electroconductive slide member using the composite material of carbon nanofiber and resin claimed in claim 3.

6. An electroconductive and thermally-conductive member using the composite material of carbon nanofiber and resin claimed in claim 3.

7. A composite material of carbon nanofiber and resin, wherein the carbon nanofiber claimed in claim 2 is blended into resin.

8. A container for electric or electronic devices using the composite material of carbon nanofiber and resin claimed in claim 7.

9. An electroconductive slide member using the composite material of carbon nanofiber and resin claimed in claim 7.

10. An electroconductive and thermally-conductive member using the composite material of carbon nanofiber and resin claimed in claim 7.

* * * * *